US010026261B2

(12) United States Patent
Arnone et al.

(10) Patent No.: US 10,026,261 B2
(45) Date of Patent: Jul. 17, 2018

(54) DYNAMIC WAGER UPDATING GAMBLING HYBRID GAME

(71) Applicant: Gamblit Gaming, LLC, Glendale, CA (US)

(72) Inventors: Miles Arnone, Sherborn, MA (US); Eric Meyerhofer, Pasadena, CA (US); David Chang, San Gabriel, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 242 days.

(21) Appl. No.: 14/954,931

(22) Filed: Nov. 30, 2015

(65) Prior Publication Data

US 2016/0086439 A1 Mar. 24, 2016

Related U.S. Application Data

(63) Continuation of application No. PCT/US2014/040094, filed on May 29, 2014.

(60) Provisional application No. 61/828,327, filed on May 29, 2013.

(51) Int. Cl.

*G06F 17/00* (2006.01)
*G07F 17/32* (2006.01)
*G07F 17/34* (2006.01)

(52) U.S. Cl.

CPC .......... *G07F 17/3227* (2013.01); *G07F 17/32* (2013.01); *G07F 17/3204* (2013.01); *G07F 17/3286* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |

(Continued)

OTHER PUBLICATIONS

U.S. Appl. No. 14/815,764 Arnone, et al. filed Jul. 31, 2015.

(Continued)

*Primary Examiner* — Ronald Laneau
(74) *Attorney, Agent, or Firm* — Caitlyn Ross

(57) ABSTRACT

A gambling hybrid game with dynamic wager updating is disclosed. The gambling hybrid game includes an entertainment system engine that provides an entertainment game to a user, a real world engine that provides gambling games to one or more users, and a game world engine that monitors the entertainment game and provides gambling games when appropriate. The gambling hybrid game during the course of game play may dynamically update a wager amount to be placed on a gambling event in the gambling game.

5 Claims, 16 Drawing Sheets

(56) References Cited

U.S. PATENT DOCUMENTS

| | | | |
|---|---|---|---|
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,430,735 | B2 | 4/2013 | Oberberger |
| 8,475,266 | B2 | 7/2013 | Arnone |
| 8,480,470 | B2 | 7/2013 | Napolitano et al. |
| 8,622,809 | B1 | 1/2014 | Arora et al. |
| 8,864,564 | B2 | 10/2014 | Oberberger |
| 2001/0004609 | A1 | 6/2001 | Walker et al. |
| 2001/0019965 | A1 | 9/2001 | Ochi |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Saito |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |

(56) References Cited

U.S. PATENT DOCUMENTS

2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184507 A1 7/2010 Gatto et al.
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0021263 A1 1/2011 Anderson et al.
2011/0045896 A1 2/2011 Sak et al.
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0202587 A1 8/2012 Allen
2012/0302311 A1 11/2012 Luciano
2012/0322545 A1 12/2012 Arnone et al.
2013/0029760 A1 1/2013 Wickett
2013/0053118 A1* 2/2013 Schueller ............ G07F 17/3218
463/17
2013/0131848 A1* 5/2013 Arnone ............... G07F 17/3244
700/91
2013/0190074 A1 7/2013 Arnone et al.
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0357350 A1 12/2014 Weingardt et al.
2016/0086439 A1* 3/2016 Arnone .................. G07F 17/32
463/22

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/949,759 Arnone, et al. filed Nov. 23, 2015.
International Search Report and Written Opinion, PCT/US2014/040094, dated Oct. 3, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No.14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.

(56) References Cited

OTHER PUBLICATIONS

U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.

* cited by examiner

DYNAMIC WAGER UPDATING GAMBLING HYBRID GAME

CROSS-REFERENCE TO RELATED APPLICATIONS

The current application is a continuation of Patent Cooperation Treaty Application No. PCT/US14/40094, filed May 29, 2014, which claims the benefit of U.S. Provisional Application No. 61/828,327, filed May 29, 2013, the disclosure of each of which is incorporated herein by reference as if set forth herewith.

FIELD OF THE INVENTION

Embodiments of the present invention are generally related to gaming and more specifically to systems and processes that provide a gambling hybrid game in which wagers in a gambling game are dynamically updated based on events during play of an entertainment game.

BACKGROUND

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game.

SUMMARY OF THE INVENTION

The disclosed embodiments relate generally to an interactive entertainment game where skill and chance may coalesce to provide a rich arcade-style gaming experience, visually exciting and challenging, where players may wager cash, credits prizes and points in order to win more of the foregoing. Many of the embodiments of the design provide an enticing method of gaming to the players who expect a high level of entertainment content in their gaming experience compared to the relatively simple game methods in use today.

In accordance with embodiments of this invention, a casino electronic game machine providing dynamic wager updating in a gambling hybrid game that includes an entertainment game and a gambling game, including a real world engine including a real world credit meter, a random number generator, and a real world credit pay table, where the real world engine is configured to receive real world credit from a portable media, where the portable media includes at least one member of a group including currency, a voucher and a smart card and provide a randomly generated payout of real world credits from a wager of real world credits in a gambling game using the random number generator and real world credit pay table, augment an amount of real world credits stored in the real world credit meter based on the randomly generated payout of real world credits to the real world credit meter; an entertainment software engine configured to execute the entertainment game, generate an update indicating a game state of the entertainment game, communicate, to a game world engine, the update indicating the game state of the entertainment game, receive, from the game world engine, an adjusted wager, communicate, to the game world engine, the confirmation from a player of the adjusted wager for a gambling event, receive, from the game world engine, a result of the gambling event; a display screen configured to display a user interface that displays an adjusted wager, and display the result of the gambling event; a user input device configured to receive confirmation from the player of the adjusted wager; the game world engine configured to monitor the entertainment game gameplay player actions for a gambling event occurrence detected during the player's skillful execution of the entertainment game in accordance with at least one gambling event occurrence rule, receive, from the entertainment system engine, the update indicating the game state of the entertainment game, adjust the wager to provide the adjusted wager for use in the gambling event based upon the update of the game state, communicate, to the entertainment system engine, the adjusted wager, receive, from the entertainment system engine, the confirmation from the player of the adjusted wager for the gambling event, determine an occurrence of the gambling event in the gambling game based on play of the entertainment game executed by the entertainment system engine, communicate, to the real world engine, a request that the gambling event be resolved in response to the confirmation, receive, from the real world engine, the result of the gambling event, and communicate, to the entertainment system engine, the result of the gambling event.

In accordance with numerous embodiments, the display is dynamically updated with each adjustment to the wager on an outcome of the gambling event.

In accordance with many embodiments, the entertainment game includes one or more enabling elements that are used to determine the game state of the entertainment game, the enabling element is consumed through game play of the entertainment game in a manner that is responsive to a player action, and the adjusted wager is based upon the consumption of the enabling element.

In accordance with various embodiments, one or more enabling elements are consumed during a turn of game play and the wager is adjusted in response to consumption of each enabling element received during the turn of game play.

In accordance with numerous embodiments, at least one of (i) an amount of the wager on an outcome of the gambling event, (ii) a volatility of the wager and (iii) a number of wagers is adjusted in response to the state of the game.

DETAILED DISCLOSURE OF THE INVENTION

Figure 1:
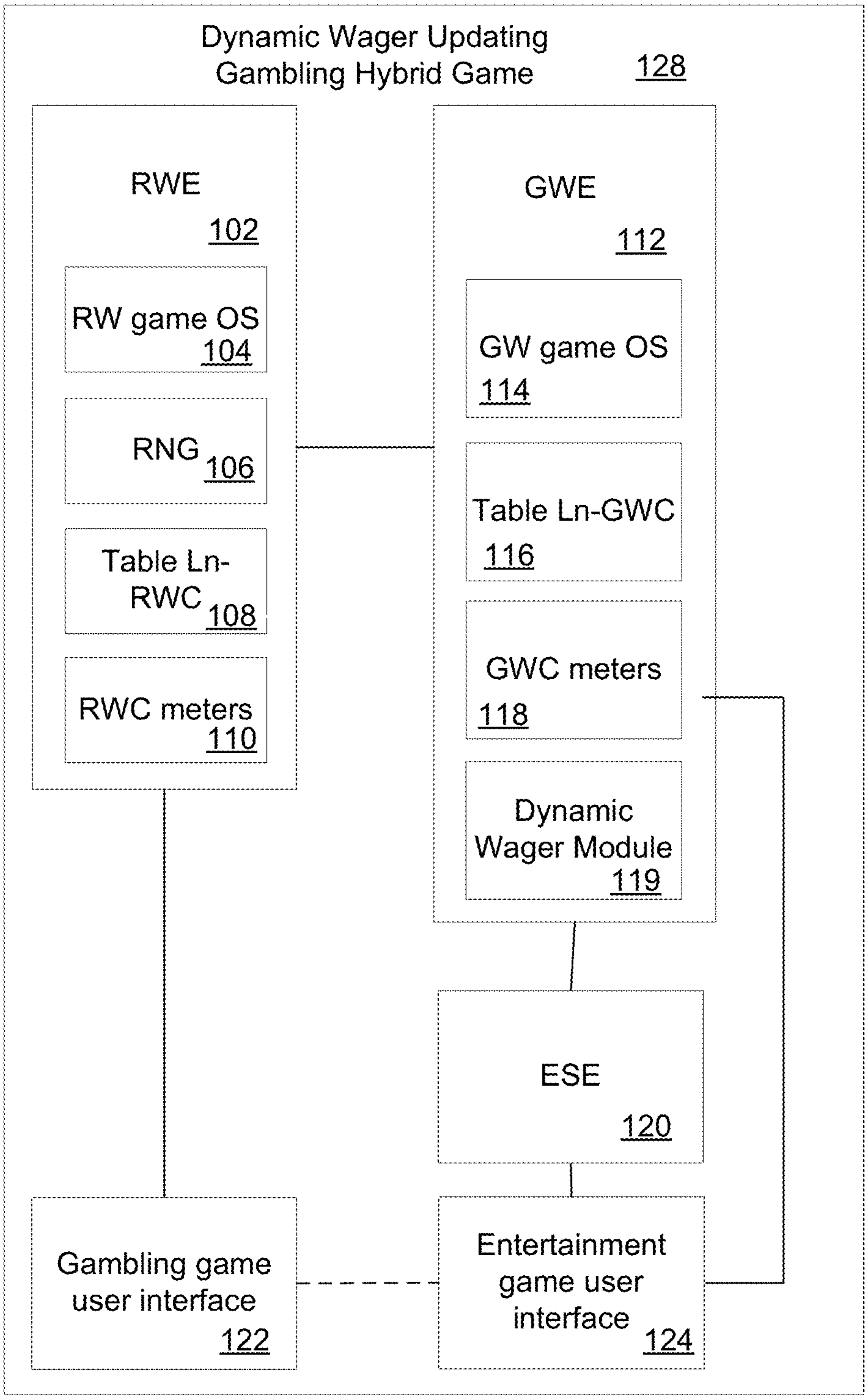
FIG. 1 illustrates a conceptual diagram of components of a gambling hybrid game in accordance with an embodiment of the invention.

Turning now to the drawings, systems and methods for providing dynamic wager updating in a gambling hybrid game (HyG) in accordance with embodiments of the invention are illustrated. In accordance with many embodiments of the invention, an entertainment game is provided by an Entertainment System Engine (ESE) and a gambling game is provided by a Real World Engine (RWE). A Game World Engine (GWE) monitors the game play of the entertainment game provided by the ESE and determines when a gambling event in the gambling game is to occur based on the game play of the entertainment game. The GWE then requests that the RWE resolve the gambling event in the gambling game either while game play in the entertainment game is continued, or paused to resolve the gambling event. The RWE resolves the gambling event including resolving any wagers on the outcome of a gambling event and provides the results to the GWE. The GWE then determines any effects the results of the outcome of the gambling event have on the entertainment game and updates the ESE accordingly to continue game play.

In many embodiments of the gambling hybrid game, a player's actions within the entertainment game during the course of a turn may dynamically update a wager for a gambling event in the gambling game. For example, in the game of Scrabble™, a player places tiles on a board sequentially prior to finalizing her turn. During the placement of tiles, the score gained from the word formed may be estimated and updated prior to the player committing to the finalized wager. In many embodiments, a series of actions during a single turn within the entertainment game has the effect of dynamically modifying an amount that is to be wagered during a gambling event in the gambling game. Continuing with the Scrabble example, the wager amount may be dynamically increased by one unit for each letter of a word that is created by the player. In various embodiments, different aspects of the wager may be dynamically updated based on the player's series of actions including, but not limited to, increasing (or decreasing) the wager amount, modifying the volatility of the wager, and modifying the number of wagers that are to be placed.

In many embodiments, at the end of a series of actions for a particular turn of the game and before the initiation of the gambling event, the gambling hybrid game presents the wager amount to the player and allows the player to confirm the amount that is to be wagered in order to allow for a player to consider and verify the amount to be wagered on a gambling event in the gambling game. After the player has verified the amount wagered, the gambling hybrid game executes the gambling event. In a number of embodiments, the gambling hybrid game provides a dynamic display of the wagering options as different player actions are considered. The dynamic display allows a player to commit the wager as soon as an action is finalized, rather than requiring an additional confirmation step. Systems and methods for providing dynamic wager updating in a gambling hybrid game in accordance with embodiments of this invention are described below.

Dynamic Wager Updating Gambling Hybrid Games

In accordance with many embodiments of this invention, a gambling hybrid game integrates high-levels of entertainment content with a game of skill (an entertainment game) and a gambling experience with a game of chance (a gambling game). A gambling hybrid game provides for random outcomes independent of player skill while providing that the user's gaming experience (as measured by obstacles/challenges encountered, time of play and other factors) is shaped by the player's skill. The outcome of a gambling proposition that is determined by a Random Number Generator (RNG) or other such device that provides a random outcome in response to a request. In accordance with some embodiments, the wager game may be initiated in response to a game object related player action. A gambling hybrid game in accordance with an embodiment of the invention is illustrated in FIG. 1. The dynamic wager updating gambling hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the dynamic wager updating gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE 102 includes a Real World (RW) operating system (OS) 104, RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

In accordance with several embodiments, the RWE 102 is the operating system for the gambling game of the dynamic wager updating gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE 102 includes a Real World (RW) operating system (OS) 104, RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (Table Ln-RC) 108 is a table that can be used in conjunction with a Random Number Generator (RNG) 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a random number generator according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game, level n, need not be the same for each level.

In accordance with some embodiments of this invention, the GWE 112 manages the overall gambling hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an Operating System (OS) 114 that provides control of the entertainment game. The GWE additionally contains a level n game world credit pay table (table Ln-GWC) 116 from where to take input from this table to affect the play of the entertainment game. The GWE may also contain the dynamic wager module 119, which receives information from the ESE 120 regarding the state of the entertainment game and may adjust the wager based upon the state of the entertainment game, and output information regarding the wager to the entertainment game user interface 124. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and his or her activities in the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a RNG. In accordance with some embodiments, GWCs are player points earned or depleted as a function of player skill, specifically as a function of player performance in the context of the entertainment game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of this invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a Personal Computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a gambling hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, now U.S. Pat. No. 8,790,170 issued Jul. 29, 2014, the contents of each of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting portions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special portion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a gambling hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the gambling hybrid game can leverage very popular titles with gamers and provides a sea change environment for casinos to attract players with games that are more akin to the type of entertainment that a younger generation desires. In accordance with various embodiments, players can use their skill towards building and banking Game World Credit (GWC) that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, gambling hybrid games also allow players to gain entry into subsequent competitions through the accumulation of Game World Credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The gambling hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

In accordance with some embodiments, the use of the RWE, GWE and ESE allows for the separation of control of a gambling hybrid game between different devices. For example, the ESE may be hosted by a device that is separate from any devices that host the RWE and/or GWE. Through separation of control of the functions of the ESE, RWE and GWE, the RWE may be isolated from the player's device, thus preventing player interference with the RWE and the gambling game. In addition, as the ESE is responsible for providing the entertainment game, gambling hybrid games may provide for complex entertainment games for the player as the ESE need not include the tightly regulated components of the RWE, thus providing for more freedom in ESE design. Also, separation of control allows a GWE to provide complex wager initiation rules that would not be possible if the either the ESE or the RWE were to be in control of the wager initiation.

In accordance with various embodiments, a gambling hybrid game allows for interleaving of continuous wagering within an entertainment game. For example, instead of wagering once, and then playing an entertainment game to completion, or playing an entertainment game to completion and then placing a wager, a gambling hybrid game allows a gaming system or device to be provided to a player where the gaming system or device provides a complex and interesting entertainment game with wagering incorporated throughout the entertainment game.

In various embodiments, a gambling hybrid game provides for feedback into the entertainment game of additional entertainment game resources that are made available in the ESE for the use of the player as the result of wagering outcomes. The additional entertainment game resources may enable portions of the entertainment game that were not available to the player without the resources.

In many embodiments, a gambling hybrid game provides the ability to use the gambling hybrid game in more than one jurisdiction, as the ESE is a component separate from the GWE and RWE. For example, the ESE may be operated as either a pure entertainment game, or as a gambling game depending on the type of characteristics of the RWE that the ESE is coupled to.

In some embodiments, a gambling hybrid game provides for display of an entertainment game on a player's device that the player is using to interact with the entertainment game, as well as providing a separate display of a state of a gambling game on a separate gambling game display. The separate gambling game display may be on the player's device within the same physical display device, on a separate device having a separate physical screen, or on a separate physical display device on the player's device.

Figure 2:
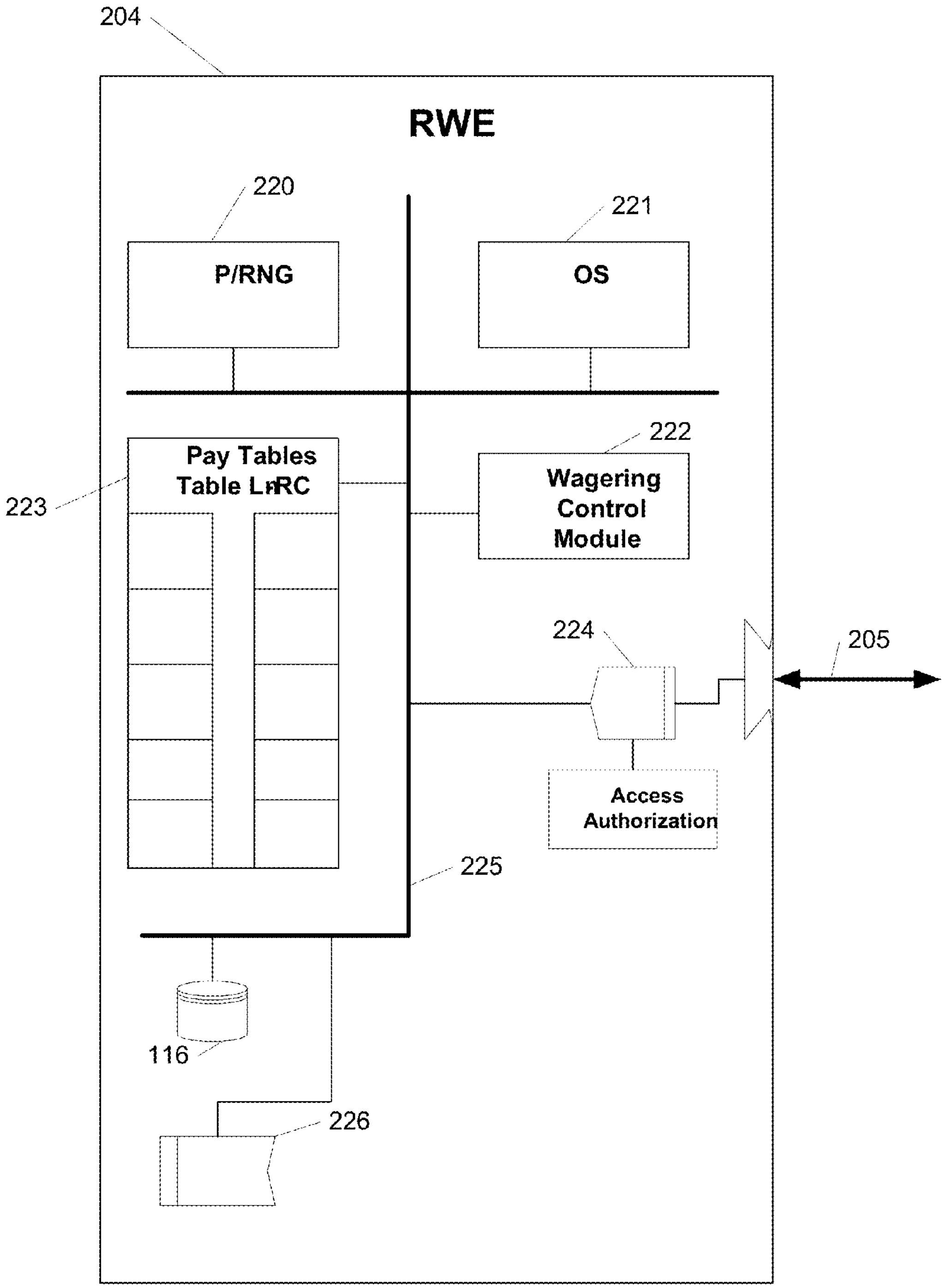
FIG. 2 illustrates a conceptual diagram of aspects of a Real World Engine (RWE) of a gambling hybrid game in accordance with some embodiments of the invention.

The components provided by the RWE for a gambling hybrid game in accordance with embodiments of the invention are shown in FIG. 2. In accordance with embodiments of the invention, the RWE includes an internal bus 225 that connects an operating system OS 221, a Pseudo Random or Random Number Generator (P/RNG) 220, one or more pay tables (Table Ln-RC) 223, a wagering control module 222, an authorization access module 224, and a RC credit meter 226 that are included in the RWE 204. The RW OS 221 controls the functions of the RWE 204. The P/RNG 220 includes one or more RNGs that are used to produce random numbers for use in resolving gambling events and other process requiring a random number to determine an outcome. The one or more pay tables (Table Ln-RC) 223 control the functions of the RWE and contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 226 maintains a record of the amount of RC which a player has deposited in the game and has been accumulated by the player.

An external connection allows the RWE 204 to interface to another system or device, which is shown in FIG. 2 as the Internet 205 but may be any other network and/or device. The authorization access module 224 of RWE 204 is connected to the external connection and provides a method to permit access and command exchange between an external system and the RWE 204. The RWE 204 also contains storage for statuses, wagers, wager outcomes, meters and other historical events in a storage device 116.

Figure 3:
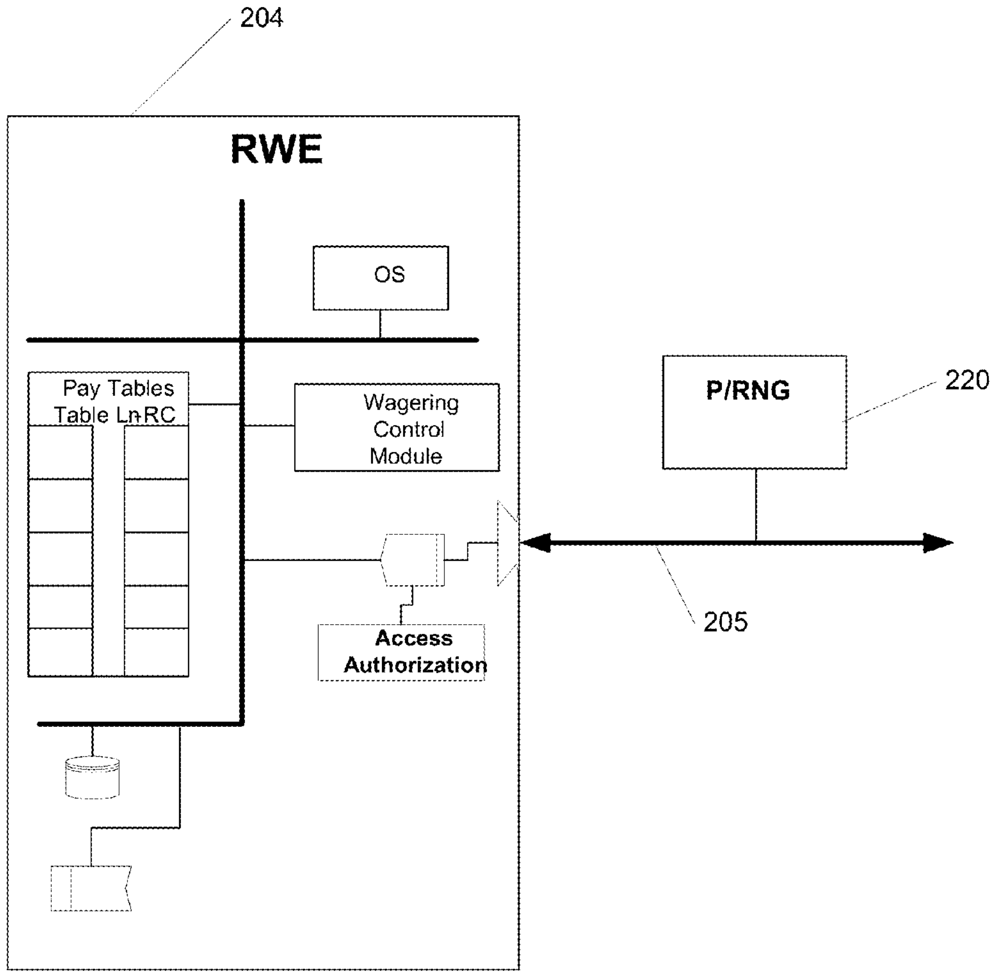
FIG. 3 illustrates a conceptual diagram of aspects of a Real World Engine (RWE) of a gambling hybrid game in accordance with some other embodiments of the invention.

In some embodiments, the RWE 204 communicates with external systems to provide various functions of a gambling hybrid game in accordance with embodiments of the invention. The components of an RWE 204 that communicate with an external system to provide a component of the RWE 204 in accordance with embodiments of the invention are shown in FIG. 3. The RWE 204 shown in FIG. 3 is similar to the RWE shown in FIG. 2. However, the P/RNG 220 is an external system connected to the RWE 204 by the Internet 205 in accordance with embodiments of the invention. The P/RNG 220 could be a central deterministic system, such as a regulated and controlled random numbered ball selection device, or some other system which provides random or pseudo random numbers to one or a plurality of connected RWEs 204. One skilled in the art will recognize that only P/RNG 220 is an external system in the embodiment illustrated in FIG. 3. However, any of the components could be external systems without departing from the invention and P/RNG 220 is shown as an example only.

In FIGS. 2 and 3, the RWE 204 interfaces with other systems/devices or to an external P/RNG 220 using the Internet 205. However, one skilled in the art will note that nothing would preclude using a different interface than the Internet 205 in other embodiments of the invention. Other examples of interfaces include, but are not limited to, a LAN, a USB interface, or some other method by which two electronic and software constructs could communicate with each other.

Figure 4:
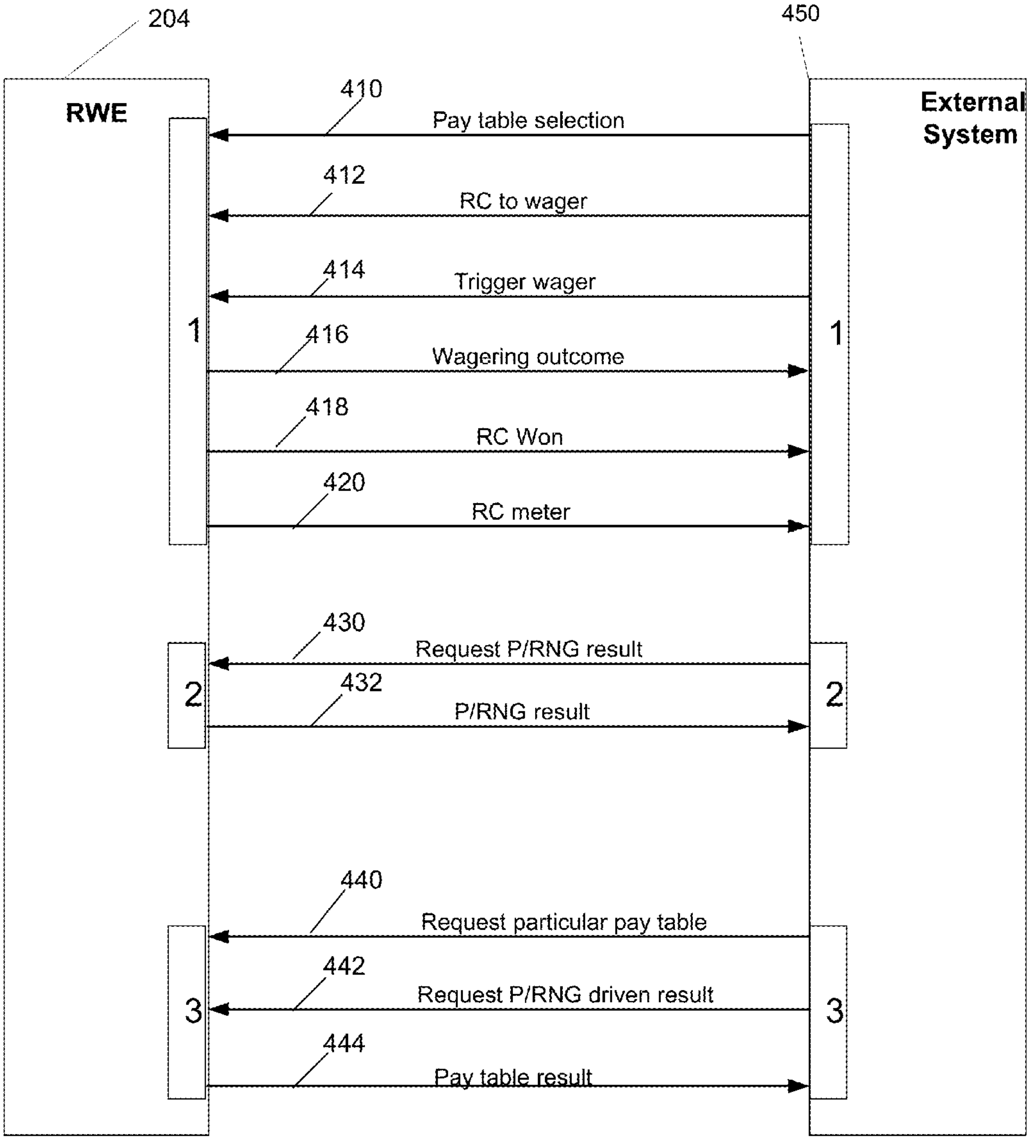
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with many embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during a gambling hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an P/RNG result support from the RWE 204. In this exchange, the external system 450 requests an P/RNG result from the RWE 204 (430). The RWE 204 returns a P/RNG result to the external system 450 in response to the request (432). The result may be generated as a function of the internal P/RNG in the RWE 204, or from a P/RNG external to the RWE 204 to which the RWE 204 is connected.

A third communication exchange between the RWE 204 and the external system 450 in accordance with embodiments of the invention that is shown in FIG. 4 is grouped by the "3" box in the figure and relates to the external system 450 wanting support on coupling an P/RNG result to a particular Pay Table contained in the RWE 204. In this exchange, the external system 450 instructs the RWE as to the pay table (Table Ln-RC) to use (440). The external system (450) then requests a result whereby the P/RNG result is coupled to the requested Pay Table (442). The result is returned to the external system 450 by RWE 204 (444). Such an aspect is different from the first exchange shown by the box "1" sequence in that no actual RC wager is conducted. However, such a process, t, might be useful in coupling certain non-RC wagering entertainment game behaviors and propositions to the same final resultant wagering return which is understood for the gambling hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
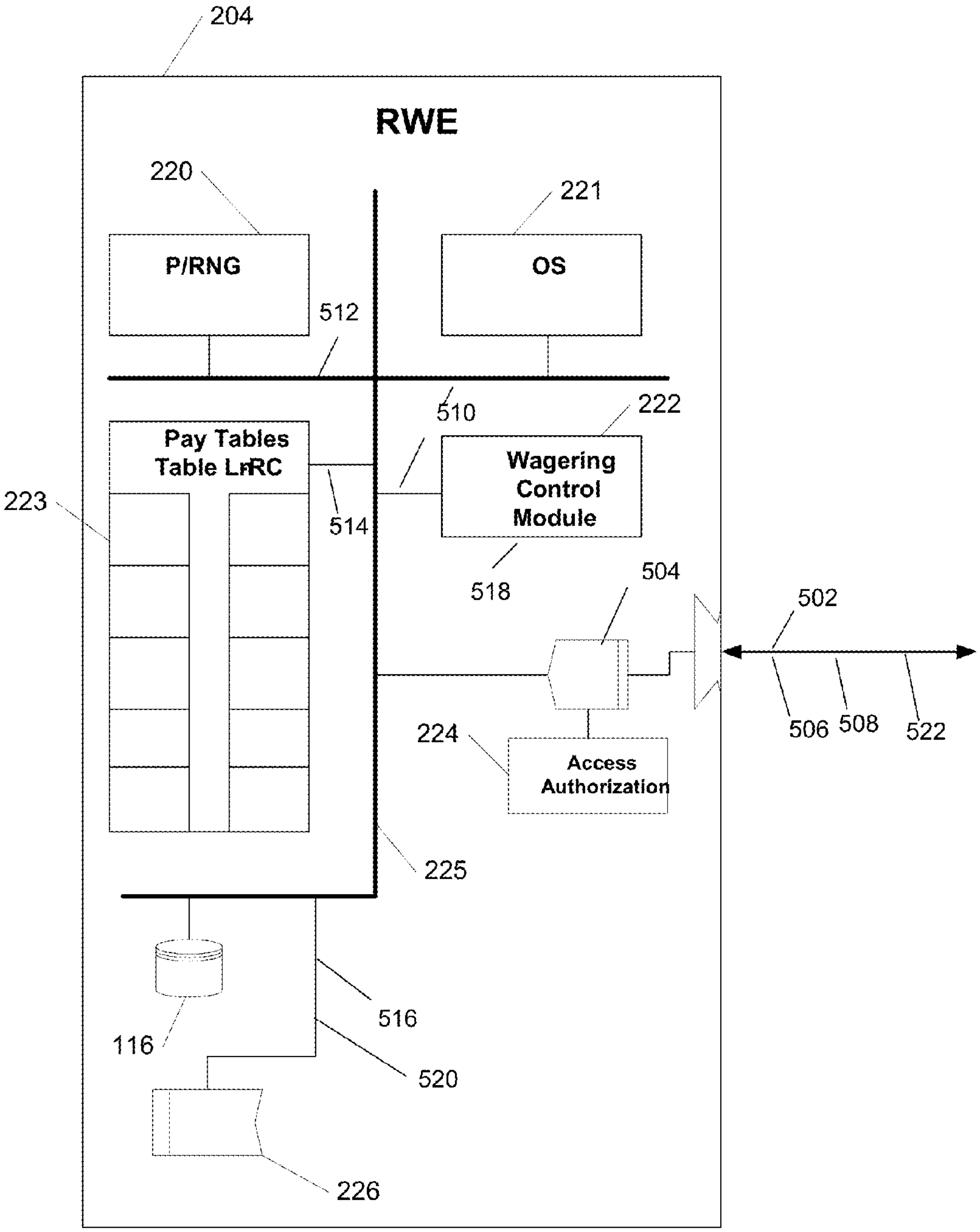
FIG. 5 illustrates a diagram of a process flow and signaling in a Real World Engine (RWE) to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204 (502). The Access Authorization Module determines that the external system is authorized to connect to RWE 204 (504) and transmits an authorization response to the external system. The external systems provide a request for a gambling event to be performed to the RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execution (510). In response to the request to execute the gambling event, the wager control module 222 requests an P/RNG result from the P/RNG 220 (512); retrieves a proper pay table or tables from the pay tables 223 (514); adjusts the RC of the player in the RC repository 226 as instructed (516); applies the P/RNG result to the particular pay table or tables (518); and multiplies the resultant factor from the Pay Table by the amount of RC to determine the result of the wager (518). Wager Control Module 222 then adds the amount of RC won by the wager to the RC repository 226 (520); and provides the outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
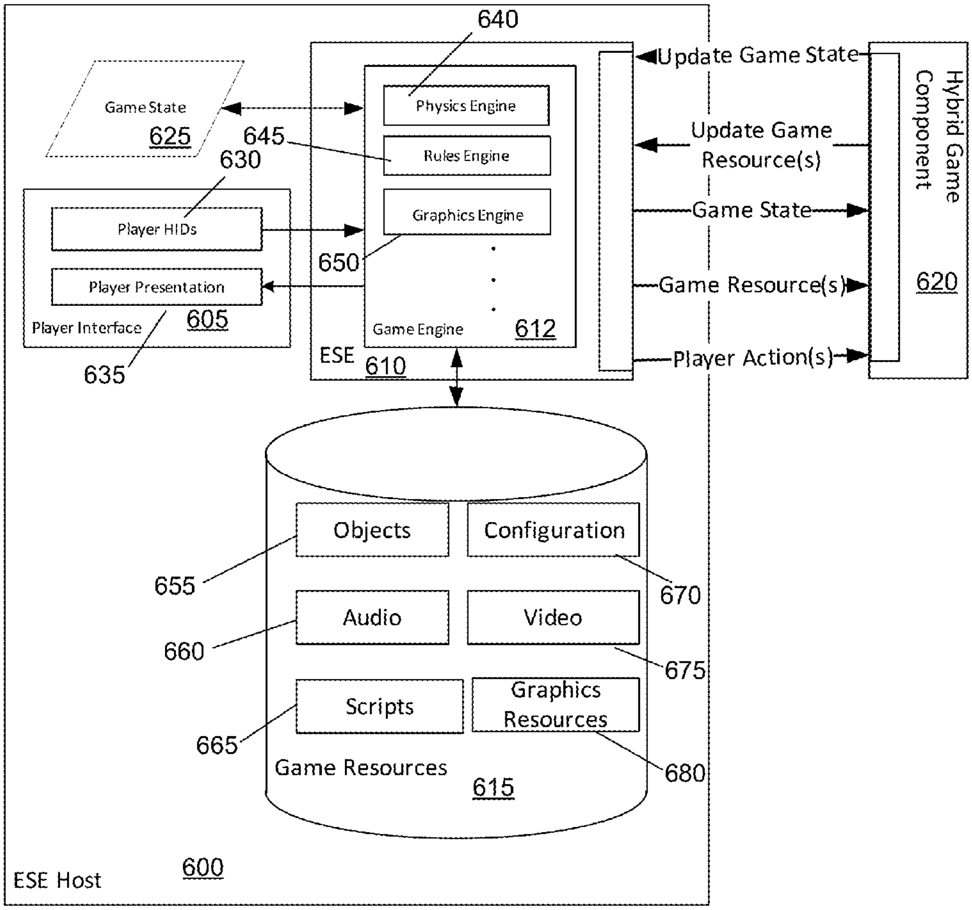
FIG. 6 illustrates a conceptual diagram of aspects of an Entertainment System Engine (ESE) in accordance with embodiments of the invention.

A block diagram of components of an ESE being provided by an ESE host 600 for a gambling hybrid game in accordance with embodiments of the invention is shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, an P/RNG that may be used for influencing or determining certain variables and/or outcomes to provide a randomizing influence on gameplay, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various gameplay features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process can loop in a game loop continuously while the player plays the game.

In some embodiments, the ESE 610 is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE 610 is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of a gambling hybrid game, such as a GWE. The ESE 610 and the other gambling hybrid game component 620 communicate with each other using the interfaces, such as by passing various types of data and sending and receiving messages, status information, commands and the like. Examples of communications include, but are not limited to, requesting by the gambling hybrid game component 620 that the ESE 610 update the game state using information provided by the other component; requesting, by the gambling hybrid game component 620, that the ESE 610 update one or more game resources using information provided by the gambling hybrid game component 620; the ESE 610 providing all or a portion of the game state; the ESE 610 providing one or more of the game resources to the gambling hybrid game component 620; and the ESE 610 communicating player actions to the other gambling hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos. PCT/US11/26768, filed Mar. 1, 2011, now U.S. Pat. No. 8,632,395 issued Jan. 21, 2014, PCT/US11/63587, filed Dec. 6, 2011, published as US Patent Application Publication No. 2013/0296021 A1, and PCT/US12/50204 filed Aug. 9, 2012, published as US Patent Application Publication No. 2013/

0260871 A1, each disclosure of which is hereby incorporated by reference in its entirety.

Figure 7:
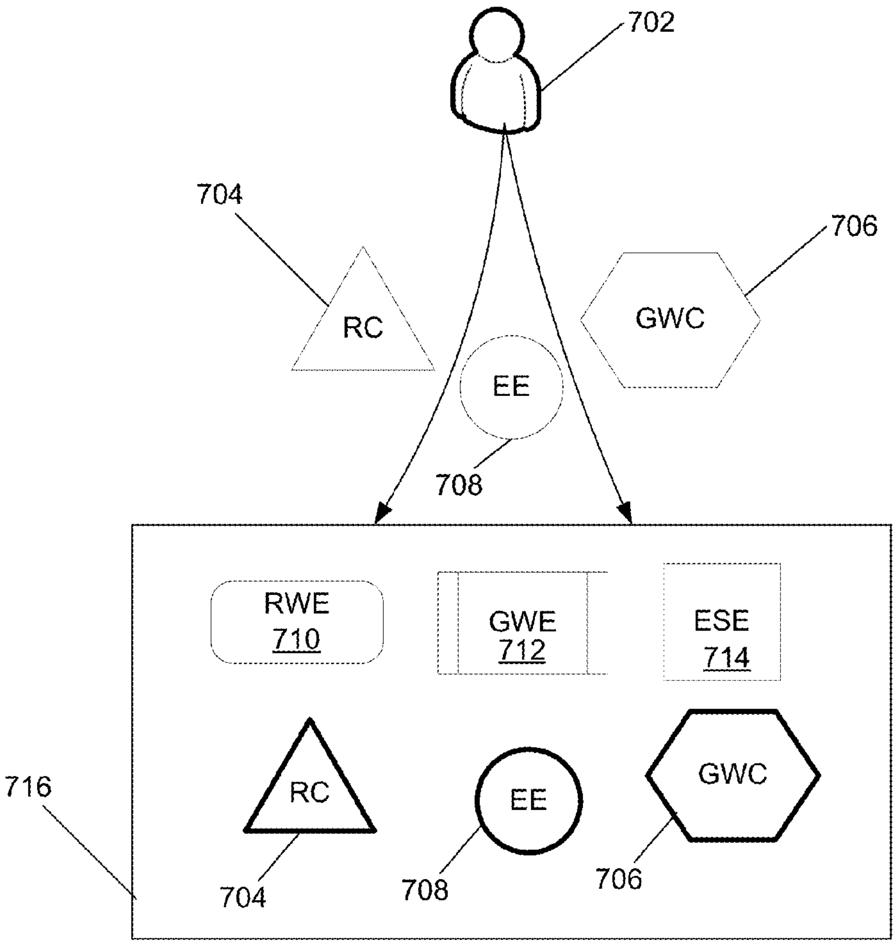
FIG. 7 illustrates a conceptual diagram of interactions between a user and a gambling hybrid game in accordance with embodiments of the invention.

In accordance with some embodiments, a player can interact with a gambling hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to enabling elements (EE), are utilized in a gambling hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a gambling hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a gambling hybrid game or in a remote server.

Figure 8:
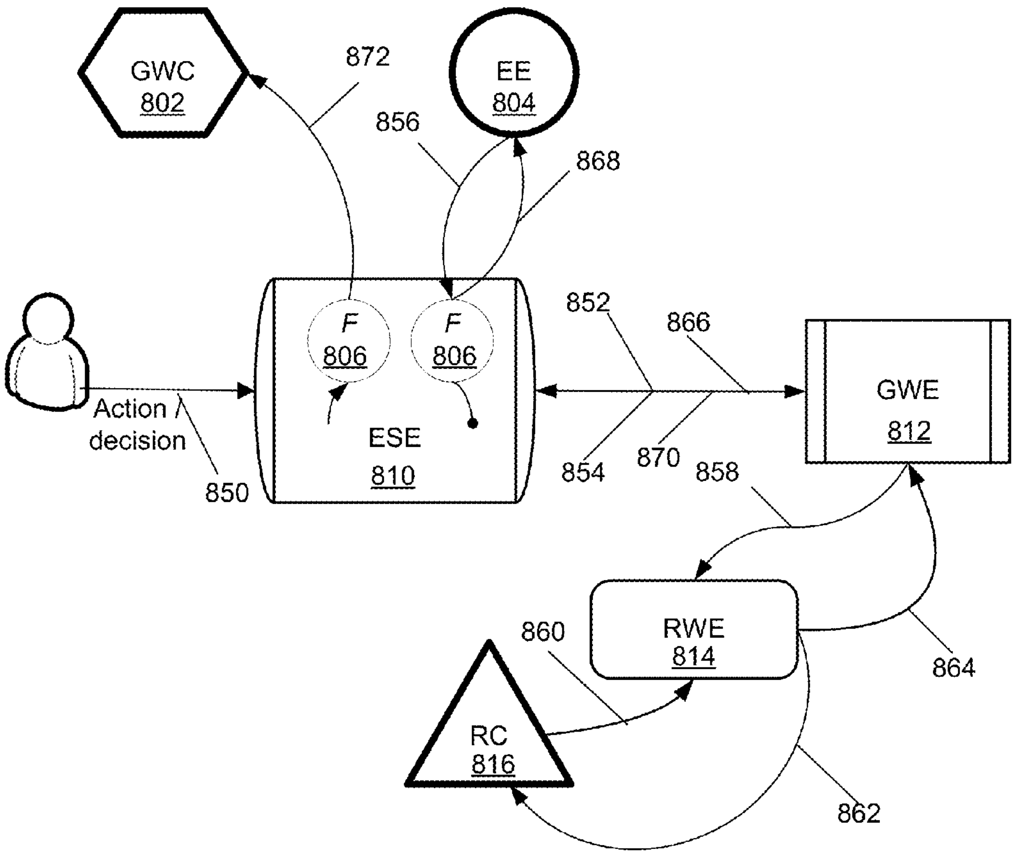
FIG. 8 illustrates a conceptual diagram of the interplay between aspects of a gambling hybrid game in accordance with some embodiments of the invention using Real World Currency (RC).

A conceptual diagram that illustrates the interplay between aspects of a gambling hybrid game in accordance with an embodiment of the invention using real world credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the gambling hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates the GWC 802 using a function 806 (872).

The following is an example of the above flow in a first person shooter game, such a Call of Duty®, using a gambling hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during gameplay. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Figure 9:
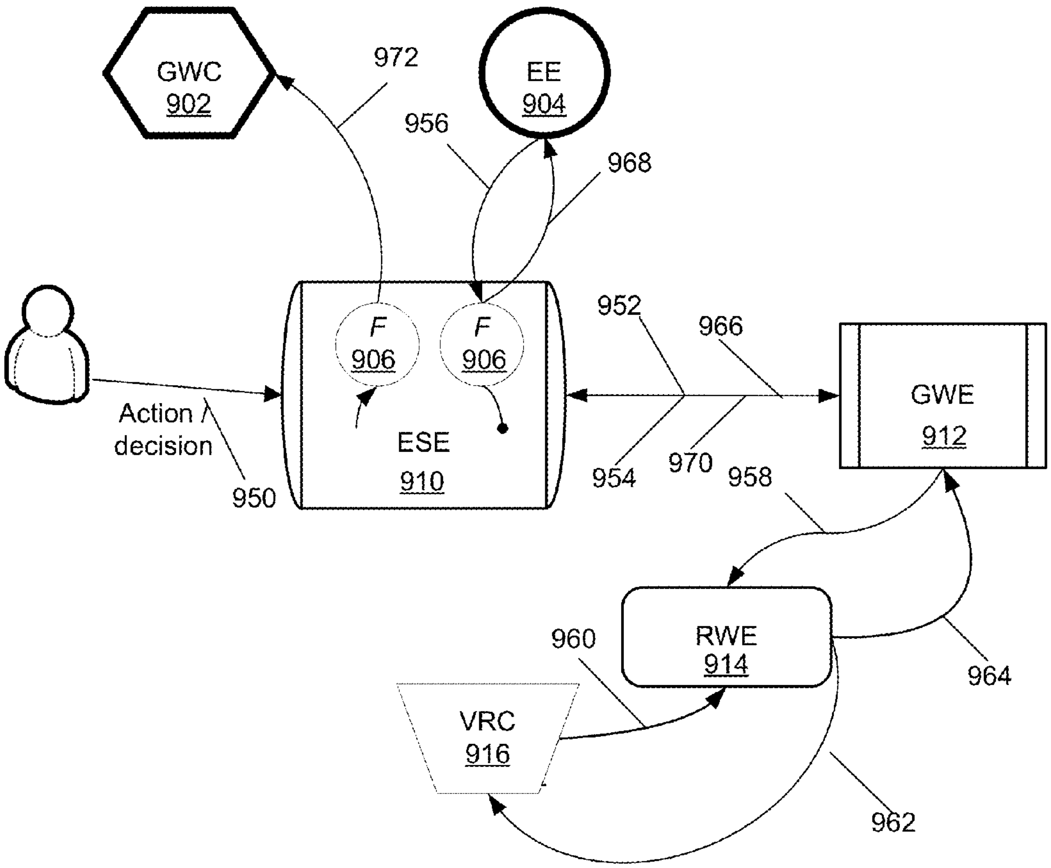
FIG. 9 illustrates a conceptual diagram of the interplay between aspects of a gambling hybrid game in accordance with other embodiments of the invention using Virtual Real World Currency (VRC).

A conceptual diagram that illustrates the interplay between aspects of a gambling hybrid game in accordance with an embodiment of the invention using virtual real world credit (VRC) is illustrated in FIG. 9. As seen in the FIG. 9, substituting VRC in place of RC is effected without impact to the architecture or operation of the gambling hybrid game. The implementation of FIG. 9 is not the only embodiment using virtual currency within a gambling hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a gambling hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the gambling hybrid game that Triax Jacks would be wagered in place of RC, such that the gambling hybrid game could be played for free, or with played with operator sponsored Triax Jacks.

Returning to the process in FIG. 9, the following may occur during use of the gambling hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Gambling Hybrid Game

Figure 10:
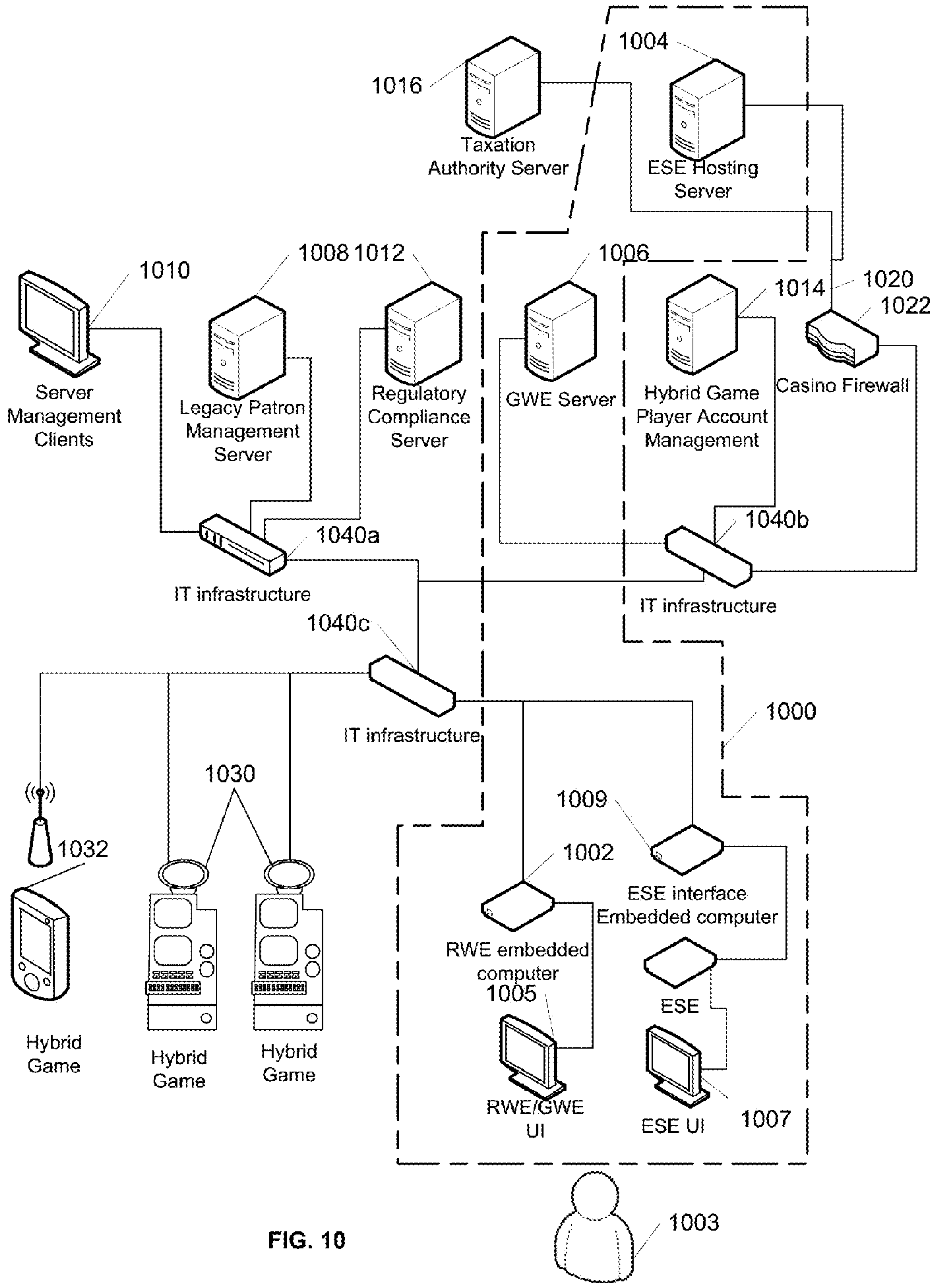
FIG. 10 illustrates a system diagram of an implementation of a network based gambling hybrid game in accordance with another embodiment of the invention.

A system diagram that illustrates an implementation of a network distributed gambling hybrid game with a GWE local server in accordance with embodiments of the invention is illustrated in FIG. 10. In the figure, the gambling hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a gambling hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to illustrate all servers and systems to which a gambling hybrid game 1000 might be inevitably be connected, and indeed one might expect there would be others, but rather provides an example of a set of a sub-set of systems which would be present in an exemplary embodiment of an installation.

Figure 11:
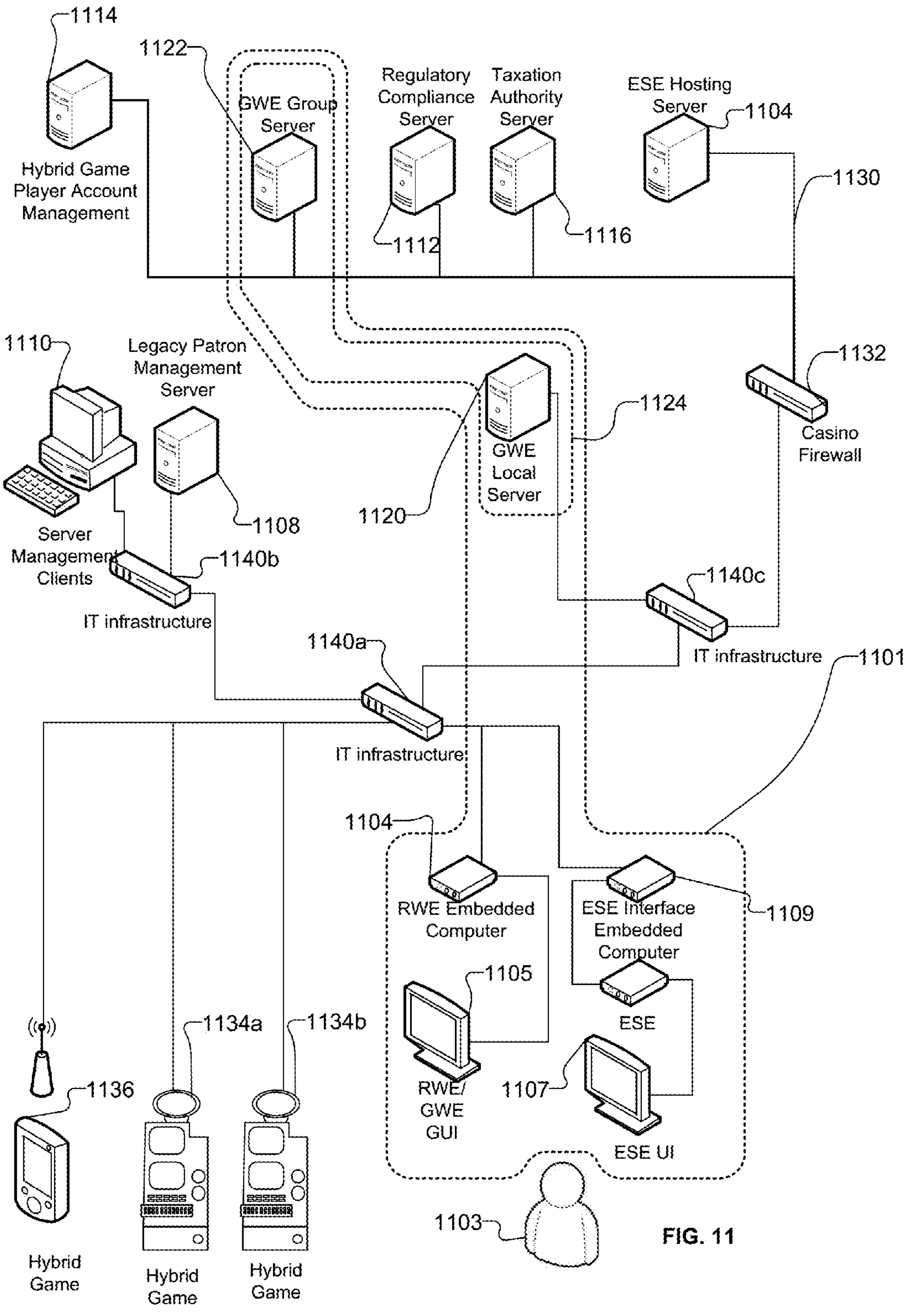
FIG. 11 illustrates a system diagram of an implementation of an Internet based gambling hybrid game in accordance with an embodiment of the invention.

FIG. 11 is a diagram showing another implementation of a gambling hybrid game in accordance with an exemplary embodiment. In the figure, the gambling hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122 (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded gambling hybrid game components via communications network such as the Internet 1130 through a firewall 1132. FIG. 11 also illustrates various other systems, which may reside outside the bounds of the casino and are connected to the framework via communications network. The end devices utilized for user interfaces for a gambling hybrid game include, but are not limited to, casino electronic game machines, 1134*a* and 1134*b*, and wireless or portable devices, such as smart phone 1136, personal digital assistants, tablet computers, video gaming consoles or the like. These disparate devices are connected within and without the casino through the casino's information technology structure as illustrated by routers 1140*a*, 1140*b* and 1140*c*. It should be understood that FIG. 11 does not attempt to illustrate all servers and systems to which a gambling hybrid game might be inevitably be connected, and indeed one might expect there would be others, but rather provides an example of a set of a sub-set of systems which would be present in an exemplary embodiment of an installation.

Figure 12:
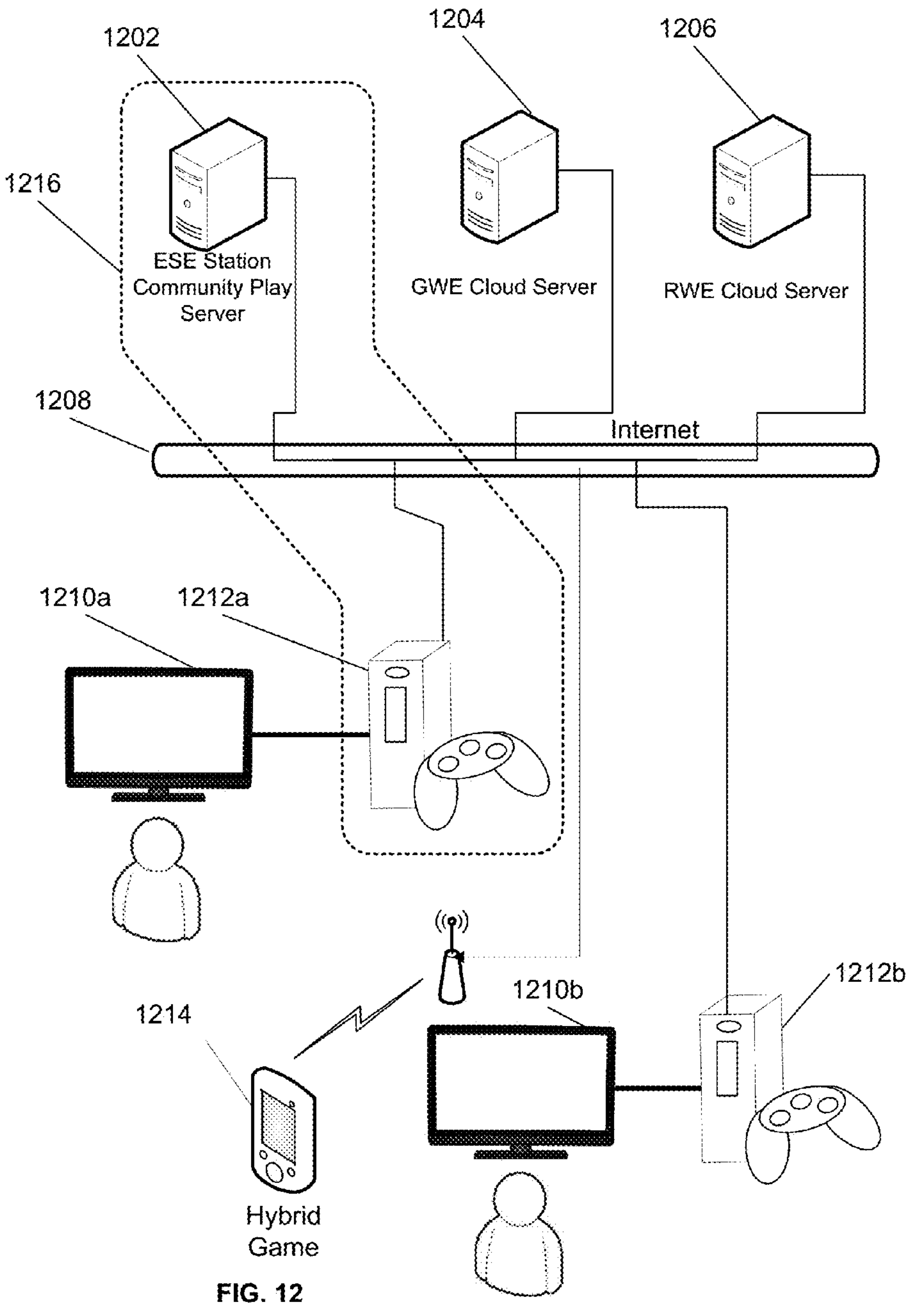
FIG. 12 illustrates a system diagram of an implementation of a cloud based gambling hybrid game in accordance with an embodiment of the invention.

A system diagram that illustrates an implementation of network a cloud based gambling hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touchscreen or PDA) of gambling hybrid games over the Internet 1208. Each gambling hybrid game includes a local ESE 1212*a* or 1212*b* (such as, but not limited to, a video game console or a gaming computer system) that interfaces with a remote ESE server 1002. Processes performed by an ESE 1212*a* services can be performed in multiple locations, such as, but not limited to, remotely on an ESE server 1202 and locally on a local ESE 1212*a*. In addition, a gambling hybrid game may include a Personal Digital Assistant (PDA) 1214 or other type of mobile computing device game coupled to the ESE hosting server 1202, thus providing the opportunity for a player to play a gambling hybrid game on the PDA through a mobile phone or data network.

There are many possible permutations of how a gambling hybrid game could be constructed, with FIGS. 10, 11 and 12 showing only three possible permutations and provided as examples, which are not intended to suggest limitations to the forms of the architecture. Other embodiments include a version where the entire gambling hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
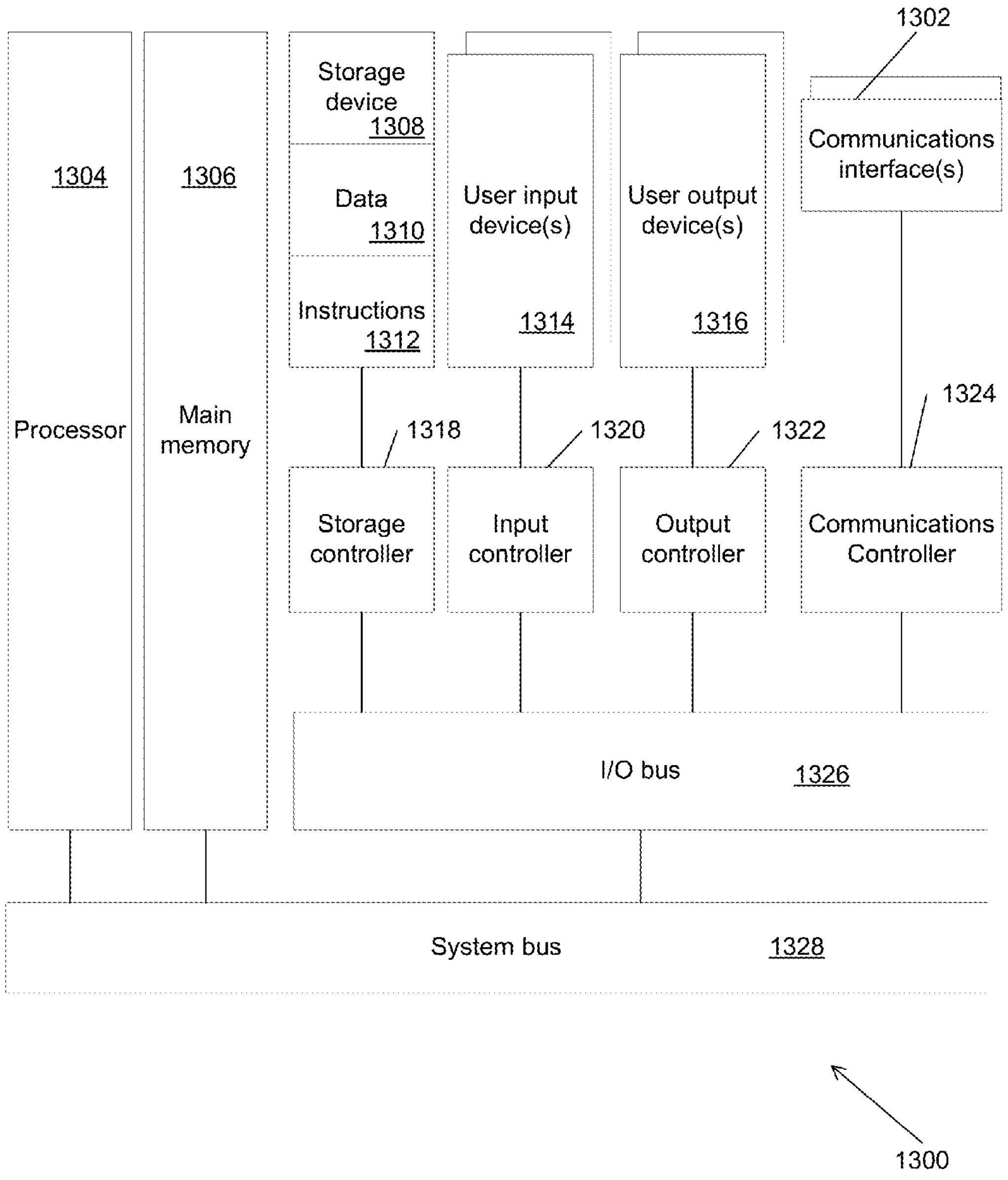
FIG. 13 illustrates a block diagram of components of a device implementing a gambling hybrid game in accordance with an embodiment of the invention.

Any of a variety of processing apparatuses can host various components of a gambling hybrid game in accordance with embodiments of the invention. In accordance with embodiments of the invention, these processing apparatuses can include, but are not limited to, a server, a client, a mobile device such as a smartphone, a personal digital assistant or the like, a wireless device such as a tablet computer or the like, an electronic gaming machine, a general purpose computer, a gaming console, a computing device and/or a controller. A processing apparatus that is constructed to implement a gambling hybrid game in accordance with embodiments of the invention is illustrated in FIG. 13. In the processing apparatus 1300, a processor 1304 is coupled to memory 1306 by a bus 1328. The processor 1304 is also coupled to non-transitory machine-readable storage media, such as a storage device 1308 that stores executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a gambling hybrid game. The processor 1304 can utilize various input and output devices in accordance with the instructions and the data in order to create and operate user interfaces for players or operators of a gambling hybrid game (such as but not limited to a casino that hosts the gambling hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

Dynamic Wager Updating in a Gambling Hybrid Game

In many embodiments, a player's actions within the entertainment game during the course of game play may cause the gambling hybrid game to dynamically update a wager for a gambling event in the gambling game. In particular, many entertainment games allow a player to commit a series of actions within a single turn of game play. The series of actions may be committed in parallel or consecutively and each action may modify the player's game world score in the entertainment game. Further, the player' actions within the entertainment game may also be used to determine the wager to be placed on a gambling event in the gambling game in a gambling hybrid game with dynamic wager updating. For example, as the player commits a series of actions during a player turn in the entertainment game that increases her game world credits, the gambling hybrid game may concurrently increase the amount of RC that is to be wagered on a gambling event in the gambling game. Once the player has finalized the player turn of game play in the entertainment game and provides a confirmation as to the wager amount, the gambling hybrid game may then execute a gambling event using the wagered amount. In accordance with some embodiments, after each player action, the entertainment system engine (ESE) notifies the game world engine (GWE) of the player's action. The game world engine may then dynamically update the wager to be placed on a gambling event in the gambling game. The ESE may continuously provide each of the player's series of actions within a turn of game play within the entertainment game to the GWE, which will then update the wager accordingly. After the player completes her turn of game play, the ESE provides the GWE with a confirmation regarding the completed player actions and/or a possible confirmation regarding the amount to be placed on a gambling event. The GWE provides the Real World Engine (RWE) with a request to resolve a gambling event in the gambling game for the particular finalized wager. The RWE resolves the gambling event and provides the result to the GWE. The GWE then updates the player's account with the appropriate amount of real credits (RC) based on the wager outcome of the gambling event.

Figure 14:
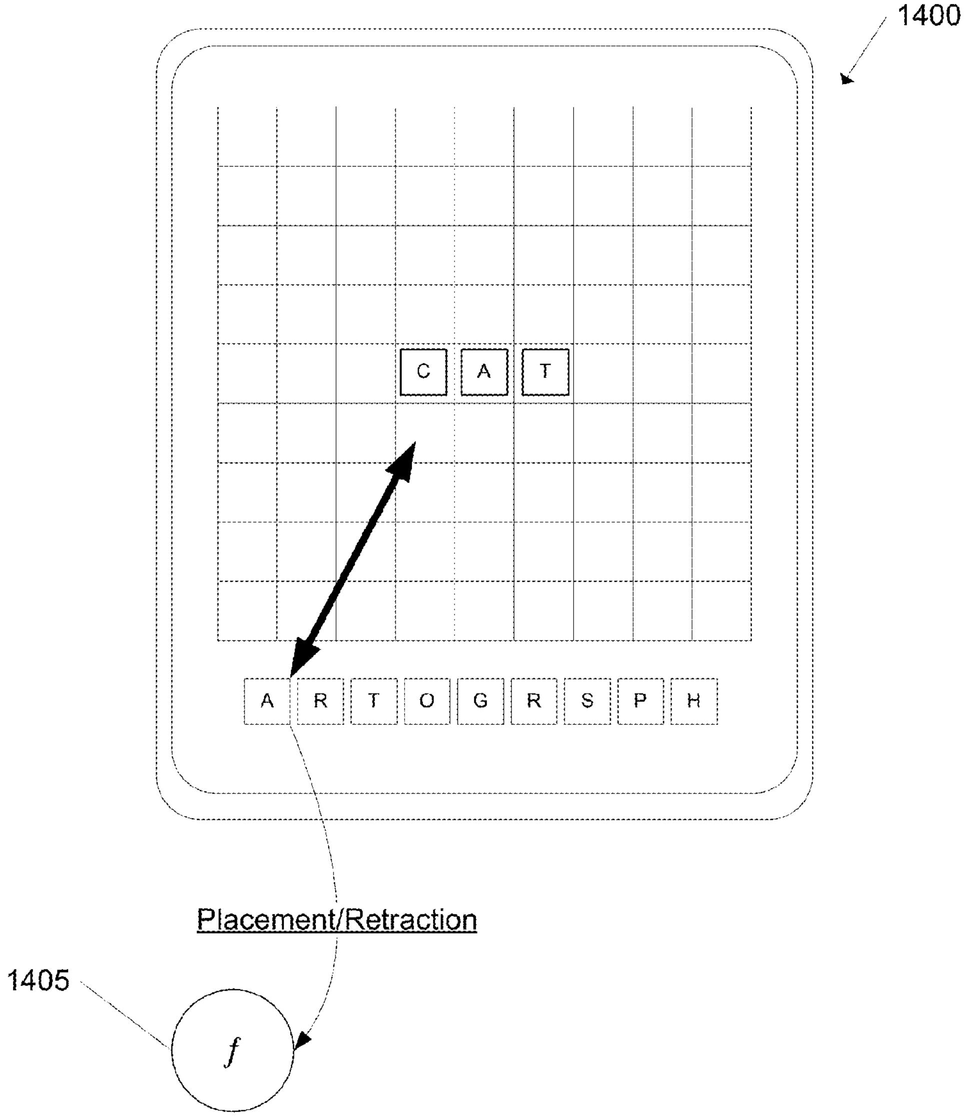
FIG. 14 conceptually illustrates a gambling hybrid game with dynamic wager updating in accordance with embodiments of the invention FIG. 15 conceptually illustrates a gambling hybrid game dynamically updating and displaying a wager amount for a gambling event based on game play in an entertainment game in accordance with embodiments of the invention

In accordance with various embodiments, different aspects of the wager within the gambling game (e.g., other than the amount of a wager) may be modified including, but not limited to, modifying the volatility of the wager, and modifying the number of wagers that are to be placed within a particular time period. A gambling hybrid game with dynamic wager updating in accordance with an embodiment of the invention is illustrated in FIG. 14. In particular, this figure illustrates a display 1400 of a tile-laying word game (e.g., Scrabble™). In the tile laying game, a player's objective is to spell out words on the game board using letters that have been made available for the player to use and the player's game world credits are increased as the player is able to spell out words that contain more of the letters that have been made available to the player. As the number of letters being used to spell a particular word increases (and thus the player's game score increases), the gambling hybrid game may apply a function 1405 to the player's score to determine an increase in the RC wager amount for a gambling event in the gambling game. In accordance with some embodiments, each letter in a spelled word may correspond to a wager mount of one RC within the gambling game in function 1405, and the total amount that may be wagered in the gambling game may be determined by function 1405 based on the total number of letters that the player has been able to use to spell a word during one turn of gameplay within the entertainment game. In display 1400, the word "CAT" is shown as spelled out in the entertainment game, which may result, although not illustrated in the figure, in the gambling hybrid game setting a wager of three RC to be placed on a gambling event in the gambling game once the player commits to the particular wager.

Furthermore, the letters "A, R, T, O, G, R, S, P, H" are still available for the player to use in order to spell other possible words. The gambling hybrid game can dynamically update the wager for a gambling event in the gambling game based upon the use of these remaining letters. The player may continue to add (or remove) letters to the game board and based on these actions the gambling hybrid game may increase (or decrease) the wager amount to reflect the current state of the entertainment game. Although function 1405 uses the number of letters of a spelled word to determine the amount of RC to wager on a gambling event in the shown embodiment, other aspects within the entertainment game may be utilized to determine the wager amount including, but not limited not limited to, the particular location that the letters are being placed on the game board, the difficulty of the word being spelled, and the value of the letter being utilized (e.g., use of the letter "Z" may correspond to 2 RC while use of the letter "A" may be 1 RC, etc.), in accordance with various embodiments. In other embodiments, any of a variety of sequences of actions within the entertainment game can be utilized to update a wager as appropriate to the requirements of specific applications.

In many embodiments, the gambling hybrid game provides a dynamic display of the wagering options as different player actions are considered, allowing a player to commit the wager as soon as an action is finalized, rather than requiring an additional confirmation step. A gambling hybrid game dynamically updating and displaying a wager amount for a gambling event based on game play in an entertainment game in accordance with an embodiment of the invention is illustrated in FIG. 15.

Figure 15:
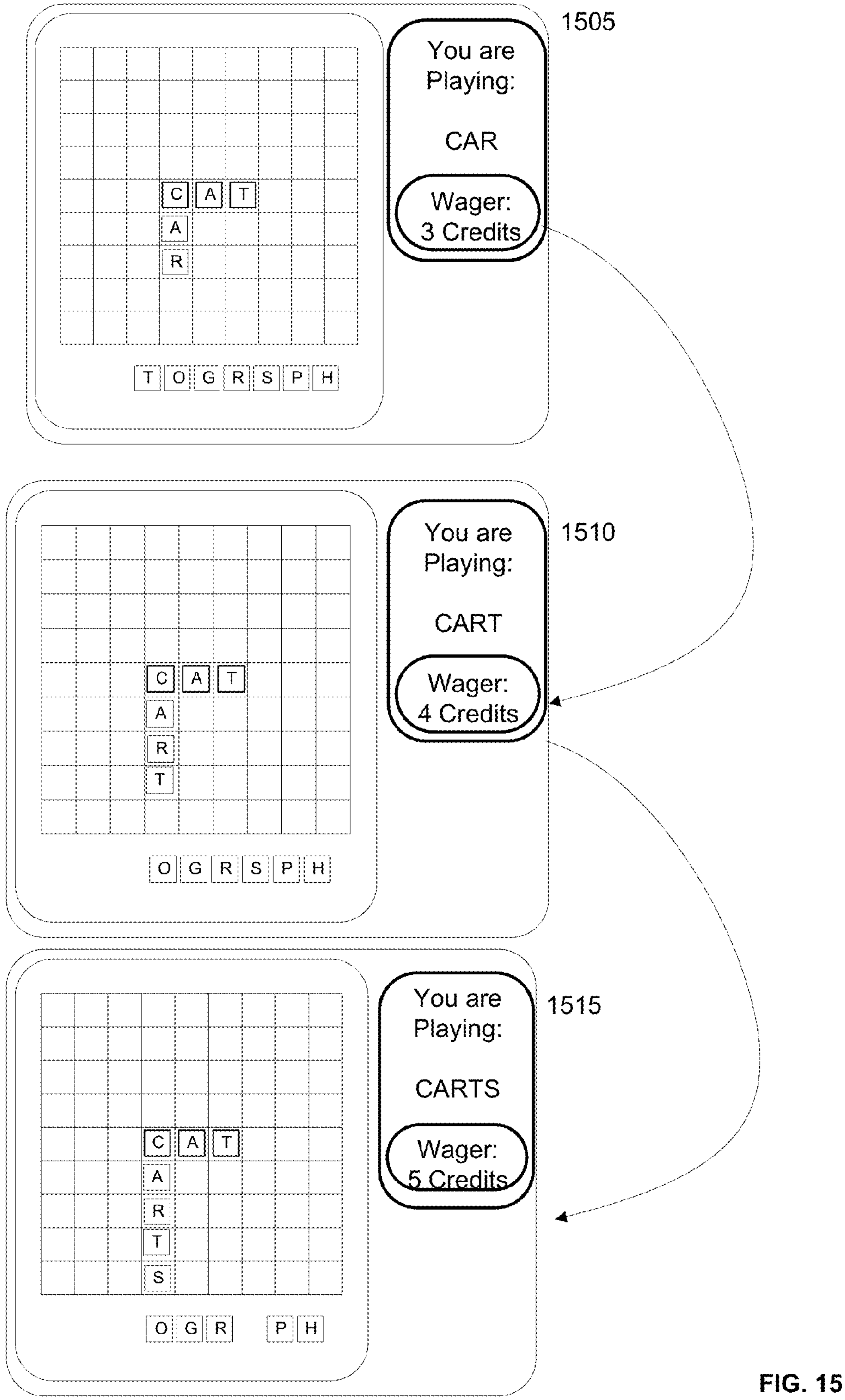

FIG. 15 illustrates displays 1505, 1510, and 1515 of the entertainment game as a player commits a series of actions in an entertainment game and shows the corresponding changes in the wager amount within the gambling game being dynamically updated after each individual action. The same tile-based game illustrated in FIG. 14 is illustrated in FIG. 15 with each letter in the entertainment game corresponding to one RC to be wagered on a gambling event in the gambling game.

In the first display 1505, the player has created the word "CAR" in the entertainment game by placing a total of three tiles on the game board. The player's use of the three tiles within the entertainment game causes the gambling hybrid game to allocate three RC as a wager amount for a gambling event in the gambling game. Thus, if the player finalizes her turn (i.e., by not adding any more letters onto the game board within a set time period), the gambling hybrid game will execute a gambling event within the gambling game with a wagered amount of three RC. In many embodiments, the gambling hybrid game presents the wager amount to the player at the end of a series of actions for a particular turn of the game and before the initiation of the gambling event in order to allow for a player to consider and verify the amount to be wagered on a gambling event in the gambling game. The player confirms the amount that is to be wagered based on the display. After the player confirms the wager, the gambling hybrid game executes the gambling event.

In the second display 1510, the player has placed a new tile "T" onto the game board that changes the word "CAR" in display 1505 to a new word "CART" that now contains four letters. As such, the wagering display dynamically updates the wager amount to reflect the addition of the new letter that has been added. In particular, the wager display now indicates that there has been an increase in the wager amount in the gambling game by one RC for a total of four RC to be placed on a gambling event in the gambling game in display 1510.

Likewise, the third display 1515 illustrates that the player has added another tile "S" onto the game board that changes the word "CART" in display 1510 to create yet another new word "CARTS" that now contains a total of five letters. Once again, the wager display dynamically updates to reflect the increase in the wager amount up to a new total of five RC to be placed on a gambling event. As such, the wager display allows a player to constantly track the value of putative wagers and betting options for gambling events based on each action that the player commits within the entertainment game. Although not illustrated, in many embodiments, had the player removed one or more tiles from the game board in the entertainment game, the gambling hybrid game would decrease the RC wager amount to reflect the decreased number of letters in the world. For example, if the player removes the letter "S" from the word "CARTS", the gambling hybrid game would reduce the wager from five RC to four RC in order to reflect the reduced number of letters of the word in the entertainment game. In some embodiments, the gambling hybrid game may modify various different aspects of the wager other than increasing or decreasing the amount of a wager. In accordance with various embodiments, the gambling hybrid game may modify the volatility of the wager, the time period between subsequent wagers, and numerous other modifications.

Figure 16:
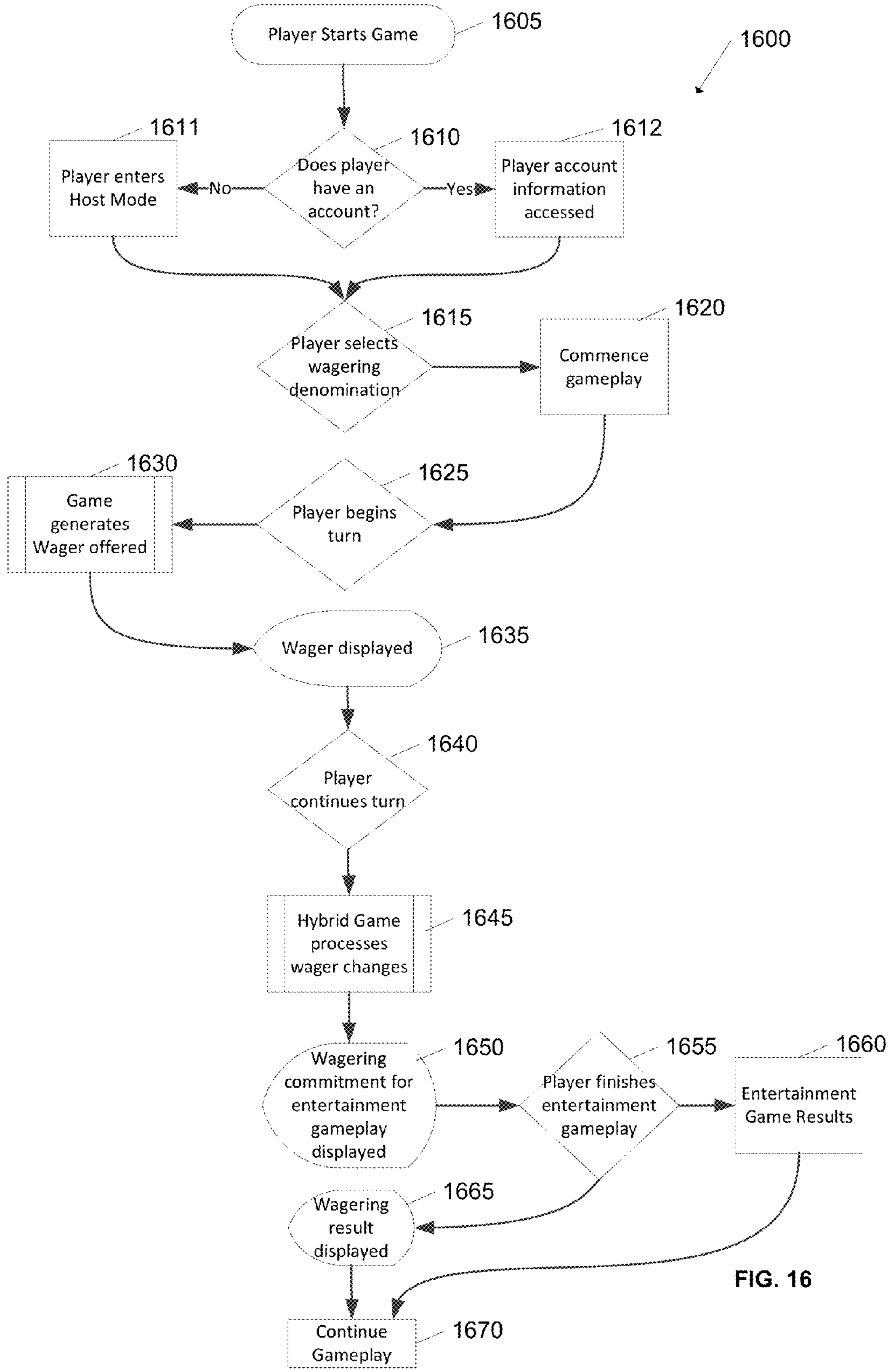
FIG. 16 illustrates a flow diagram of a process for dynamic updating of a wager in a gambling hybrid game in accordance with embodiments of the invention.

A flow diagram of a process for dynamic updating of a wager in a gambling hybrid game in accordance with an embodiment of the invention is illustrated in FIG. 16. In process 1600, the player begins play of the gambling hybrid game (1605). Upon starting the game, the player selects (1610) between using either a player account to provide Real World Credits (RWC) and/or game world credits (GWC) for play (1612) or may play a stand-alone or host version (1611) of the game in which RWC and/or GWC is entered on a per-play basis. Regardless of the selected type of game play, the player then chooses the denominations or wagering amount to use during game play (1415). The ESE then provides the game play of the entertainment game (1420). During game play of the entertainment game, the player initiates an action (1625) that may be taken during a turn of the entertainment game. For example, in the game Scrabble™, the player may place a tile on the game board. Based on the player's action, the gambling hybrid game generates a wager amount offer (1630) that may be placed on a wager in a gambling event and displays (1635) the wager amount to the player. In some embodiments, the wager amount may be displayed within an interface of the entertainment game. In a number of embodiments, the wager amount may be displayed within an interface of the gambling game. The player continues (1640) to commit actions within the entertainment game. For example, in the word-tile game, the player can continue to place additional tiles that spell out new or different words for their particular turn. Based on the player's actions within the entertainment game, the gambling hybrid game processes (1645) any changes to the wager amount. For example, in the word-tile game, after a player adds a new letter to generate a different word, the gambling hybrid game may increase the wager amount by one RC.

The gambling hybrid game displays (1650) the updated wager to be committed to a gambling event. In some embodiments, the player may modify or override the updated wager amount and specify a particular wager amount based on their particular preference. For example, the player may disable the dynamic wager updating feature such that their game play within the entertainment game is not used to modify the wager for a gambling event in the gambling game, or the player may specify a set wager amount to be applied in all gambling events regardless of the player's actions within the entertainment game.

The player may then finish (1655) the game play in the entertainment game. For example, in the Scrabble™ game, the player may press a confirm button or provide some other indication that indicates that the word is finalized for the particular turn of game play. The entertainment game results (1660) are provided to the player and displayed as part of game play. Furthermore, the results of the wagers and/or awards are provided to the player and displayed as part of the game play (1665).

In accordance with some embodiments, the results of wagers and/or awards can include, but are not limited to, contribution to a bonus pool that is awarded as a function of subsequent random events; a RC win for the player; a RC loss for the player; a RC draw for the player; a contribution to a bonus pool that is awarded as a function of player skill and/or as a function of a player's performance in one or more instances of the entertainment game; a contribution to an interstitial credit, such as Quanta, that the player can use in the current game session and/or over multiple game sessions to alter entertainment game variables; a contribution to a specific entertainment game variable without player selection or input; and a contribution to a bonus pool that is applied to a subsequent competition or tournament that the player may or may not become eligible to enter based upon factors including, but not limited to, the demonstrated skill of the player in the entertainment game, money committed to the gambling game, hours spent playing the game, and player club status. In accordance with some embodiments, the award and/or wager may be provided in lieu of the random event affecting the entertainment game. For example, the player may gain the ability to move her piece or one of the above effects may take place in a gambling hybrid game providing a Monopoly® game as an entertainment game in accordance with an embodiment of the invention. After the results of the game are determined and displayed, game play of the entertainment game continues (1670).

Although specific processes for providing gambling hybrid games with dynamic wager updating are discussed above with respect to FIG. 16, any of a variety of processes for providing a gambling hybrid game with dynamic wager updating as appropriate to the requirements of specific applications in accordance with embodiments of this invention.

In accordance with many embodiments of the invention, a gambling hybrid game provides an entertainment game and a gambling game. Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that a hybrid gaming system may be practiced otherwise than as specifically described. Thus, the foregoing description of the hybrid gaming system should be considered in all respects as illustrative and not restrictive, the scope of the claims to be determined as supported by this disclosure and the claims' equivalents, rather than the foregoing description.

What is claimed is:

1. A casino electronic game machine providing dynamic wager updating in a gambling hybrid game that includes an entertainment game and a gambling game, comprising:

a real world engine comprising:

a real world credit meter;

a random number generator; and a real world credit pay table, wherein the real world engine is configured to:

receive real world credit from a portable media, wherein the portable media includes at least one member of a group including currency, a voucher and a smart card; and provide a randomly generated payout of real world credits from a wager of real world credits in a gambling game using the random number generator and real world credit pay table;

augment an amount of real world credits stored in the real world credit meter based on the randomly generated payout of real world credits to the real world credit meter;

an entertainment software engine configured to:

execute the entertainment game stored on a non-transitory machine-readable storage medium;

generate an update indicating a game state of the entertainment game;

communicate, to a game world engine, the update indicating the game state of the entertainment game;

receive, from the game world engine, an adjusted wager;

communicate, to the game world engine, the confirmation from a player of the adjusted wager for a gambling event;

receive, from the game world engine, a result of the gambling event;

a display screen configured to display a user interface that displays an adjusted wager, and display the result of the gambling event;

a user input device configured to receive confirmation from the player of the adjusted wager;

the game world engine configured to:

monitor the entertainment game gameplay player actions for a gambling event occurrence detected during the player's skillful execution of the entertainment game in accordance with at least one gambling event occurrence rule;

receive, from the entertainment system engine, the update indicating the game state of the entertainment game;

adjust the wager to provide the adjusted wager for use in the gambling event based upon the update of the game state;

communicate, to the entertainment system engine, the adjusted wager;

receive, from the entertainment system engine, the confirmation from the player of the adjusted wager for the gambling event;

determine an occurrence of the gambling event in the gambling game based on play of the entertainment game executed by the entertainment system engine;

communicate, to the real world engine, a request that the gambling event be resolved in response to the confirmation;

receive, from the real world engine, the result of the gambling event; and communicate, to the entertainment system engine, the result of the gambling event.

2. The casino electronic game machine of claim 1, wherein the display is dynamically updated with each adjustment to the wager on an outcome of the gambling event.

3. The casino electronic game machine of claim 1, wherein the entertainment game includes one or more enabling elements that are used to determine the game state of the entertainment game, the enabling element is consumed through game play of the entertainment game in a manner that is responsive to a player action, and the adjusted wager is based upon the consumption of the enabling element.

4. The casino electronic game machine of claim 3, wherein one or more enabling elements are consumed during a turn of game play and the wager is adjusted in response to consumption of each enabling element received during the turn of game play.

5. The casino electronic game machine of claim 1, wherein at least one of (i) an amount of the wager on an outcome of the gambling event, (ii) a volatility of the wager and (iii) a number of wagers is adjusted in response to the state of the game.

* * * * *